UNITED STATES PATENT OFFICE.

WILLIAM SCHNEIDER, OF CHICAGO, ILLINOIS, ASSIGNOR TO THE WHITFIELD COMPANY, OF MEMPHIS, TENNESSEE, A CORPORATION OF MISSISSIPPI.

TELESCOPIC COMPOUND ENGINE.

SPECIFICATION forming part of Letters Patent No. 707,647, dated August 26, 1902.

Application filed March 23, 1901. Serial No. 52,628. (No model.)

*To all whom it may concern:*

Be it known that I, WILLIAM SCHNEIDER, a citizen of the United States, residing at Chicago, in the county of Cook and State of Illinois, have invented certain new and useful Improvements in Telescopic Compound Engines; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has relation to telescopic compound steam-engines, and more especially to that type known as "locomobile-engines," the invention having for its object certain improvements in the construction, whereby the efficiency of the engine is increased, its general construction simplified, and the cost of operating the same materially reduced. These objects I attain in the manner and by the means as hereinafter fully described, and illustrated in the accompanying drawings, in which—

In the above drawings I have illustrated my improvements in their application to a twin telescopic compound locomobile-engine, the reciprocating high-pressure piston-cylinders of which are connected in a well-known manner to one and the same crank-shaft, which latter is to be geared, also in a well-known manner, to the driving-axle of the vehicle by sprocket-and-chain gearing. I desire it to be understood, however, that I do not limit this invention to its application to twin locomobile-engines, as a single engine may be used; nor do I desire to limit the application of certain features of this invention to locomobile-engines, as they can be applied with equally good results to stationary and marine engines of the telescopic type.

Figure 2:
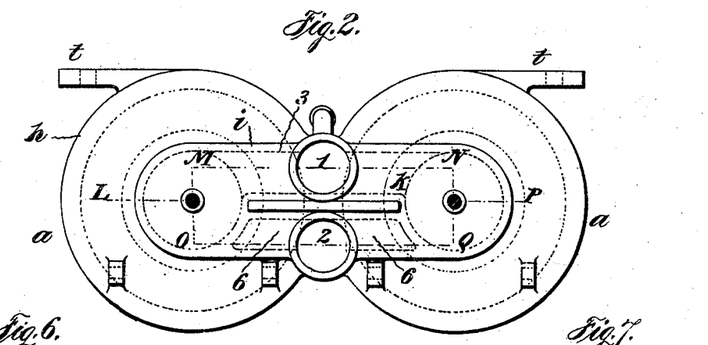
Fig. 2 is an under side view thereof, the valve-rods being shown in section and the rock-shafts and connections with said valve-rods removed.
Figures 3, 4, 10, 11, 12:
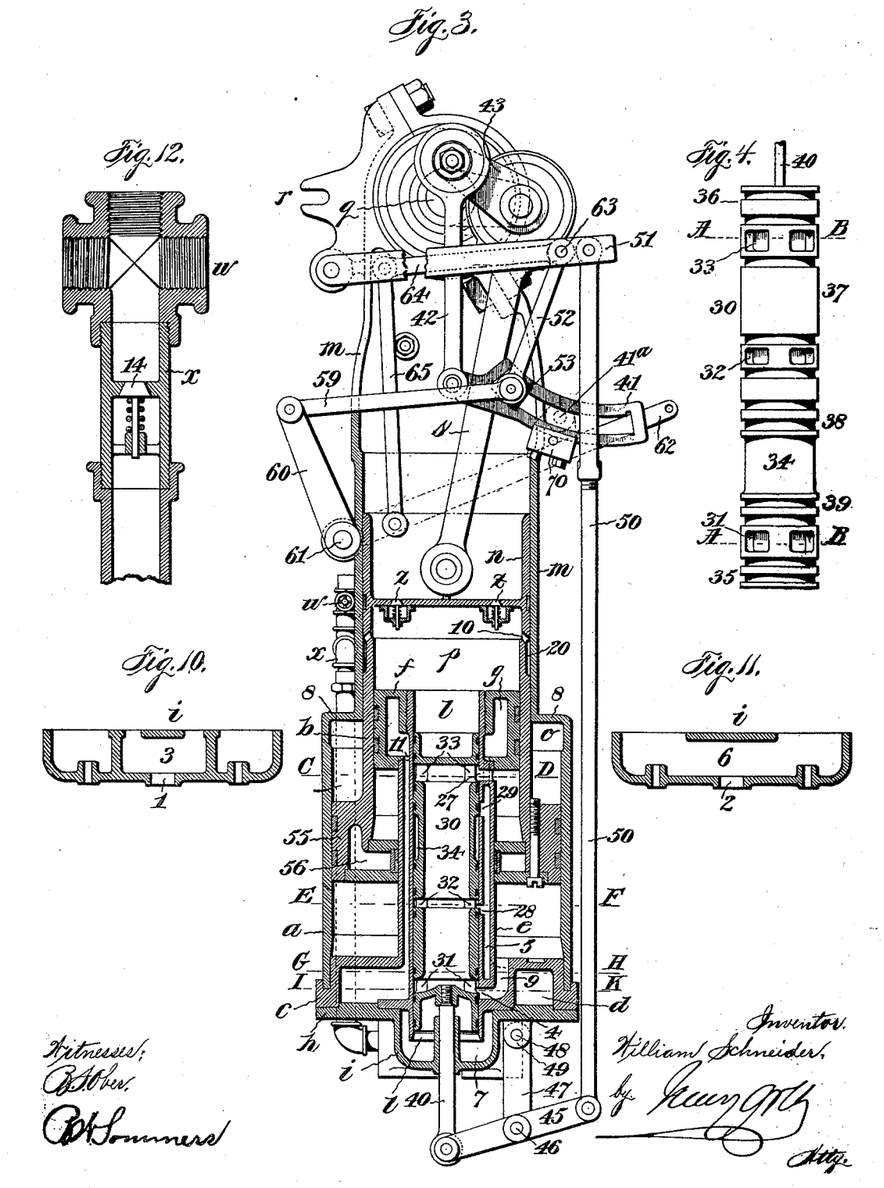
Fig. 3 is a vertical section through one of the engines.
Fig. 4 is an elevation of the engine-valve drawn to an enlarged scale.
Figs. 10 and 11 are sections taken, respectively, on the irregular lines L M N P and L O Q P of Fig. 2, drawn to an enlarged scale.
Fig. 12 is a fragmentary detail sectional view of the air-pipe of the engine.
Figure 5:
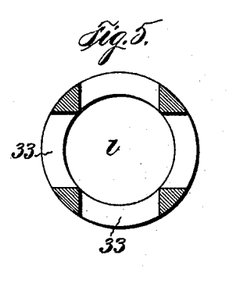
Fig. 5 is a section of said valve on line A B.
Figure 7:
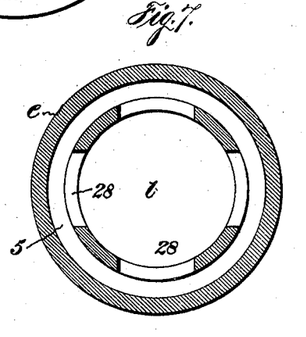

Referring now to the drawings, and as shown in Fig. 3, it being understood that both engines are alike in construction, the head $c$ of the low-pressure cylinder $a$ is chambered, as shown at $d$, and has secured thereto or preferably formed integral therewith a tubular extension $e$, to which is secured the stationary piston-abutment $f$, which latter is likewise chambered, as shown at $g$, said annular chamber $g$, the tubular extension $e$, and the annular chamber $d$ constituting the steam-chest, the chambers $d$ in cylinder-head $c$ being closed by a cap-plate $h$, common to both low-pressure cylinders, as shown in Fig. 2. This cap-plate $h$ has secured thereto or formed thereon a casing $i$ at right angles to the vertical axes of the low-pressure cylinders, and has formed therein a passage on either side of the partition $k$, Fig. 2. On one side of said partition $k$ and at a point between the two low-pressure cylinders the casing $i$ has two openings or branches 1 and 2, the former being the steam-inlet branch, which is to be connected with the source of live steam, while the latter branch 2 is the exhaust branch, Figs. 2, 10, and 11. The branch 1 leads to a passage 3, the opposite ends of which are in communication with the annular chambers $d$ in the heads $c$ of the low-pressure cylinders, as shown in dotted lines in Fig. 2 and in full lines in Fig. 10, and as chambers $d$ are in communication with the chamber $g$ in stationary abutments $f$ through tubular extension $e$ of the cylinder-heads $c$, which extension is double-walled or formed of concentric tubes to form between them a chamber 5, Figs. 3 and 7, that surrounds the inner space of said extension, which inner space constitutes the valve-casing $l$, and as said extension is arranged axially within the high and low pressure cylinders $a$ $b$, and as said valve-casing or the tubular valve therein acts as a receiver, the parts are steam-jacketed both internally and externally, and loss of steam by condensation is practically reduced to a minimum.

The exhaust branch 2 is in communication with a passage 6, whose opposite ends are in communication with the exhaust-chambers 7, formed at opposite ends of casing $i$, as shown in dotted lines in Fig. 2 and in full lines in Figs. 3 and 11, said casing $i$ being provided with bearings through which the valve-rods extend, and said exhaust-chambers 7 are in communication with their respective low-pressure cylinders through ports 4 and passages 9 in extension $e$ and the heads $c$ of the low-pressure cylinders. (See Figs. 3 and 9.)

The high-pressure cylinder $b$, whose inner head constitutes the differential piston for the high and low pressure cylinder, works in said low-pressure cylinder and on the stationary abutment, both cylinders having tubular extensions of reduced diameter, the extension $m$ of the low-pressure cylinder serving as a guide for the extension $n$ of the high-pressure cylinder.

In the head 8 of the low-pressure cylinder is formed an annular chamber $o$, constituting an air-chamber, and the tubular extension $n$ of the high-pressure cylinders is closed at a suitable point from its outer open end to form an air-chamber $p$, which latter has ports 10 leading to a reduced portion 20 of said tubular extension $n$ and forming an annular exhaust-passage, so that during the instroke of the high-pressure piston-cylinder $b$ the air will be exhausted into the air-chamber $o$ in the head 8 of the low-pressure cylinders.

The extensions $m$ of the low-pressure cylinders $a$ have formed therein the bearings for the crank-shaft $q$ and have a bifurcated extension $r$ for the usual brace for keeping the driving-chain taut, and to the cranks of said shaft $q$ are connected the high-pressure piston-cylinders $b$ by means of connecting or driving rods $s$ in a well-known manner.

On the low-pressure cylinders $a$ are formed brackets $t$, Fig. 2, for securing them to the vehicle, also in a well-known manner.

Between the extensions $m$ of the low-pressure cylinders $a$ are two pipes $u$ $v$, communicating with the air-chambers $o$, said pipes being secured to opposite branches of a four-way union or coupling $w$, to the third branch of which is connected one end of a relief-pipe $x$, whose opposite end is connected with the exhaust branch 2, and to the fourth branch of said coupling is connected a pipe $y$, provided with a regulating-cock 18. This pipe $y$ is intended to be connected with the storage-chamber for the liquid fuel which supplies heat to the steam-generator.

As is well known, the heat necessary to generate steam for locomobile-engines is generally derived from a more or less volatile liquid hydrocarbon, and in order to supply the air necessary to combustion for generating steam the hydrocarbon-reservoir, or a separate reservoir in communication therewith, is charged with compressed air. Owing to the limited space available on vehicles the quantity of air under pressure stored is comparatively small, so that the distance traveled by the vehicle is correspondingly short, and as the air is stored under pressure by means of a hand-pump frequent stoppages are necessary to renew the supply of compressed air. This is obviated by the arrangement of air-chambers and pipe connections above described and the following appliances: In the upper or outer head of the high-pressure cylinders $b$ are formed air-ports closed by inwardly-opening spring-seated valves $z$, so that as the high-pressure piston-cylinder $b$ makes its up or out stroke said valves open to admit air into chamber $p$, which, as heretofore stated, is exhausted into chamber $o$ in the low-pressure cylinders and driven out on the down or in stroke of said piston-cylinders $b$ into the coupling $w$ and pipes $x$ $y$, the high-pressure piston-cylinder acting also as an air-pump plunger. In pipe $x$ is arranged a check-valve 14, Fig. 12, held to its seat by a spring $s$, the tension of which is regulated in accordance with the pressure to be maintained in the hydrocarbon-storage tank or the compressed-air reservoir connected therewith, so that as soon as said pressure exceeds the predetermined pressure valve 14 opens and relieves the reservoir from overpressure, as will be readily understood. I thus provide a means whereby the pressure of the air necessary to form with the hydrocarbon a combustible heating fluid or to support combustion at the generator-burners is automatically maintained for a period that is limited only by the capacity of the storage-tank for the hydrocarbon. Hence the vehicle can be driven for a much longer period of time than is the case with the hand-operated pumps now in use, while the capacity of the fuel-storage tank can be materially increased.

It will be seen that pipe $x$ may be used as a relief-pipe only by closing stop-cock 18 in pipe $y$, and in practice I propose to connect said pipe by means of a flexible detachable pipe with the aforesaid reservoir or tank. On the other hand, it will be evident to any skilled mechanic that the air-chamber in the outer end of the high-pressure piston-cylinders could be dispensed with, in which case the valve-controlled air-inlet ports will be located in the outer or upper heads of the low-pressure cylinders, and as such an arrangement is so obvious I have deemed it unnecessary to illustrate the same.

Figure 13:
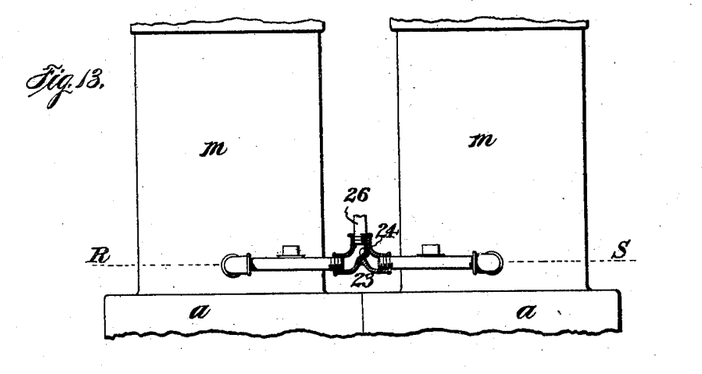
Fig. 13 is a fragmentary elevation of the outer end or extensions of the high and low pressure cylinders, illustrating a modified arrangement of air compressing and forcing appliances.
Figure 14:
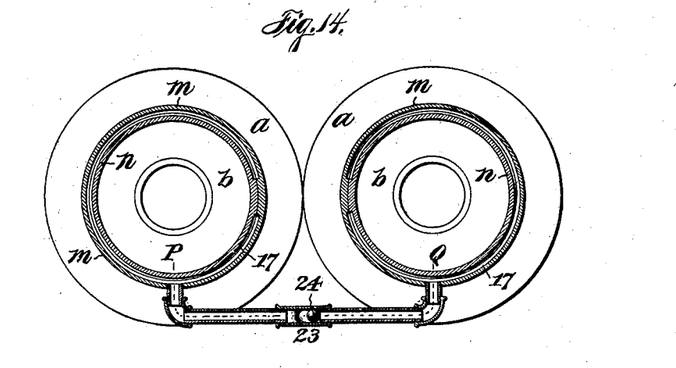
Fig. 14 is a cross-section on line R S of Fig. 13.
Figure 15:
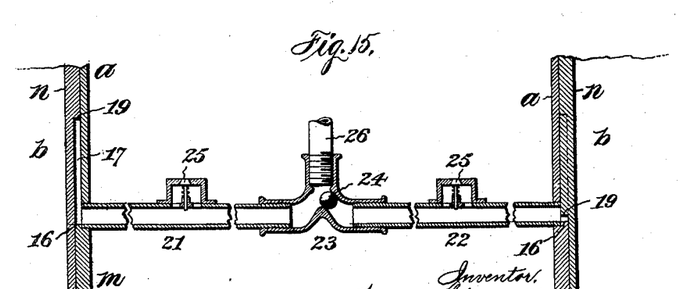
Fig. 15 is a vertical fragmentary section on line P Q of Fig. 14.

Although the above-described arrangement for relieving the high and low pressure cylinder extensions of air-pressure and utilizing such air or a part thereof for purposes stated is a very convenient one, yet I prefer the arrangement shown in Figs. 13 to 15, the air-pipes $u$ $v$ $x$ being then used solely as a means for relieving the outer closed ends of the high and low pressure cylinder extensions of air-pressure, the third branch of the coupling $w$ being closed and the check-valve 14 in relief-pipe $x$ dispensed with.

The arrangement shown in Figs. 13 to 15 is as follows: The extension $n$ of the high-pressure cylinder $b$ has an external peripheral portion of a reduced diameter extending nearly around said extension, forming an annular shoulder 19. The extension $m$ of the low-pressure cylinder $a$ has a corresponding internal reduced portion, forming a shoulder 16, the nearly-annular chamber 17 thus formed constituting a pumping-chamber, the shoulders 19 on high-pressure-cylinder extension $n$ performing the function of plunger. As stated, this pumping-chamber 17 does not extend clear around the extensions $n$ $m$, but terminates at points on either side of the exhaust-port 10 and exhaust-passage 20 in high-pressure-cylinder extension, so as not to interfere with the relieving of the chamber $p$ in the outer end of said high-pressure cylinder, the closure of this end being necessary in locomobile-engines to prevent access of dust and dirt to the valve-casing and valves. The compression-chambers 17 are connected by pipes 21 and 22 with a valve-casing, and the flow of compressed air through said valve-casing is controlled by a suitable valve, so as to close the outlet of one pipe and uncover the outlet of the other, according as the high-pressure cylinder of one engine makes its suction or out stroke and that of the other its forcing or in stroke, as will be readily understood.

In Figs. 13 to 15 I have shown a well-known construction of valve-casing 23 and ball-valve 24, controlling the flow of air through pipes 21 and 22.

In Fig. 15 I have shown the left-hand high-pressure cylinder about to make its forcing or in stroke, the right-hand high-pressure cylinder being about to make its suction or out stroke, the ball-valve 24 closing pipe 22.

In order to admit air to chamber 17, each pipe 21 and 22 may be provided with an air-intake controlled by an inwardly-opening check-valve 25, though these air-intakes may be applied to the pumping-chambers 17, as will be readily understood.

To the outlet branch 26 of valve-casing 23 is connected the pipe, preferably a flexible pipe, through which air is supplied to the liquid-fuel tank or to an air-reservoir connected therewith or to the combustion-chamber of the steam-generator.

I have hereinbefore stated that the tubular extension $e$ of low-pressure cylinder-head $c$ is double-walled or composed of two concentric tubes, forming between them a steam-chamber 5. The inner tube extends beyond the outer tube and is screwed into the stationary abutment $f$, serves as a support therefor, and also constitutes the open-ended valve-casing $l$, and has ports 27 and 4 in communication with the high and low pressure cylinders, respectively, and auxiliary ports 28 and 29.

Figure 6:
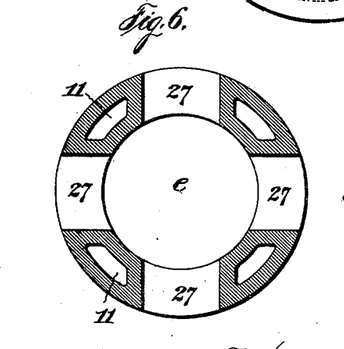
Figs. 6 to 9, inclusive, are sections of the valve-casing and steam-chest, taken, respectively, on lines C D, E F, G H, and I K of Fig. 3 and drawn to an enlarged scale.
Figure 8:
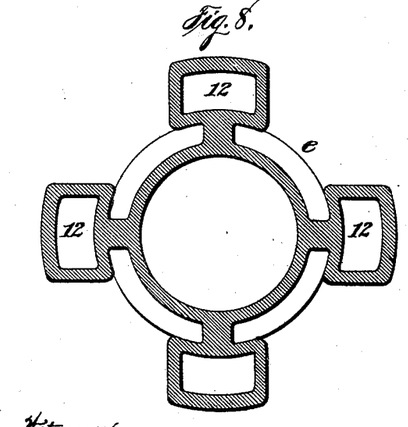
Figure 9:
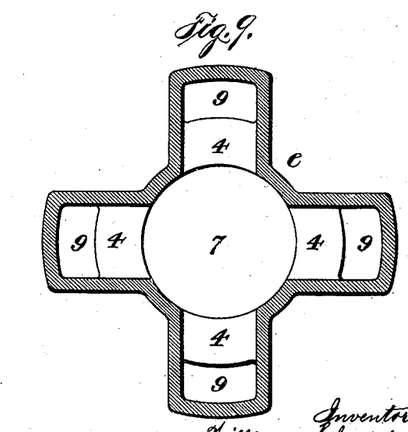

Between the points of connection of the extension $e$ and the chambers $g$ in abutment $f$ said extension has a head provided with steam-passages 11 between each two ports 27, Fig. 6, and near its lower end said extension is constructed as shown in Fig. 8, 12 indicating the passages leading from the chamber in the low-pressure cylinder to annular steam-space 5. The lower end of said extension is constructed as shown in Fig. 9, which shows the exhaust-ports 4 communicating through valve-casing $l$ (not shown) with the exhaust-chamber 7. In the valve-casing $l$ works a tubular valve 30, Figs. 3 and 4, provided with ports 31, 32, and 33, which coöperate with ports 27, 28, and 4 in the valve-casing $l$. The valve 30 has also a reduced portion 34 to form an annular space between it and the valve-casing. The heads 35 36 of the valve 30, as well as its intermediate valve or bearing-faces 37, 38, and 39, Fig. 4, are suitably packed to form a steam-tight joint with the casing, and to the lower head 36 of said valve is secured the valve-rod 40, pivoted to one end of a rock-lever 45, mounted on a spindle 46, having its bearings in one end of link 47, mounted on a spindle 48 in brackets 49 on the cap-plate $m$ for the low-pressure cylinder-heads $c$. To the opposite end of the rock-lever is connected a rod 50, which in turn is connected with the free end of a lever 51. The lever 51 is connected, through a rod 52, with a block 53, that is displaceable in a segmental slot in a quadrant-lever 41, arranged to oscillate on a fixed pivot 41$^a$, midway between the ends of the slot in said quadrant-lever, which latter is secured to a block 70, having a lug provided with a bearing for said pin 41$^a$, on which the block is free to oscillate. The quadrant-lever 41 is connected, through a rod 42, with a pin on the free end of a radial arm 43 on the crank of the crank-shaft $q$, so that as the crank revolves an oscillating or rocking motion is imparted to the quadrant and therethrough to the lever 51, which latter imparts a reciprocating motion to the valve-rod 50 and therethrough to the valve 30. The block 53 is also connected, through rod 59, with a rock-lever 60 on a shaft 61, common to the rock-levers for the two engines, said shaft having secured thereto the operating-lever 62, that is to be connected with the operating-rod (not shown) within reach of the driver. To the pivot-pin 63 of rod 52, connected with block 53, is connected one end of a link 64, (shown partly in full and partly in dotted lines in Fig. 3,) whose opposite end is connected to a rod 65, pivoted to the outer end of the high-pressure cylinder b.

In Fig. 3 I have shown the reversing-gear and link-motion in their respective positions when the engine is working semicompound, the valve 30 having its maximum travel, the high-pressure piston-cylinder b being shown at half-stroke and the valve in position to establish communication between the interior of the valve 30 and the high-pressure piston-cylinder b through valve-casing ports 27 and valve-ports 33 and between the interior of the valve and the low-pressure cylinder through valve-ports 31, casing-ports 4, and passages 9, the edges of valve-ports 32 uncovering casing-ports 28, thus placing the valve in communication with the live-steam spaces 5. Live steam from spaces 5 will therefore be admitted through ports 28 and 32, the valve 30, and ports 31 4 to the low-pressure cylinder and through valve 30 and the ports 33 and 27 to the high-pressure piston-cylinder. Owing to the greater area of the low-pressure piston-face of the piston-head 55 of the high-pressure piston-cylinder, the latter will make its outstroke. At the completion of the outstroke of the high-pressure piston-cylinder and valve the latter will be in a position to place the ports 27 of said cylinder in communication with the live-steam spaces 5 of the valve-casing e through the ports 29 and the annular passage 34 between the valve and its casing, while the ports 4 will establish communication between the low-pressure cylinder and the exhaust-chamber 7 through the valve-casing below the valve, the high-pressure piston-cylinder making its instroke under the action of live steam. At the completion of this second instroke of the high-pressure cylinder and valve the latter will be in position to place the ports 27 and 33, the ports 4 and 31, and the ports 32 and 28 in communication, so that steam from high-pressure piston-cylinder will exhaust into low-pressure cylinder and live steam will at the same time be admitted to said low-pressure cylinder through ports 28 and 32 during a portion of the stroke determined by the lead of the valve, the engine now working semicompound, the crank-shaft revolving in a given direction. If it becomes necessary to reverse the rotation of said crank-shaft, the lever 62 is depressed to cause the block 53 to move to the opposite end of the slot in quadrant-lever 41, thereby reversing the oscillations of said lever, and consequently the reciprocating movements of the valve-rod 50, as will be readily understood. When the increased power of the engine derived from the described semicompound action is no longer needed, the valve-gear is adjusted so as to reduce the travel of the valve sufficiently to cause the engine to work compound. This is effected as follows, it being assumed that the valve-gear is in the position shown in Fig. 3: Lever 62 is moved until the pin on the sliding block 53, to which the link 52 is pivoted, assumes a position nearer to the neutral center 41$^a$ of the quadrant-lever 41, thereby shortening the travel of the valve to such an extent as to prevent the admission of live steam from steam-spaces 5 in valve-casing e through the ports 28 and 32 on the outstroke, the valve 30 being then in a position to place the high-pressure piston-cylinder in communication with the low-pressure cylinder through ports 27 33, valve 30, and ports 31 4, auxiliary ports 28 32 being closed, the low-pressure stroke being effected by expansion of steam from high-pressure piston-cylinder. At the completion of said low-pressure stroke the valve will be in a position to establish communication between the high-pressure piston-cylinder and the live-steam spaces 5 through the auxiliary ports 29 and annular passage 34, while the low-pressure cylinder is placed in communication with the exhaust-chamber 7 through ports 4 and the valve-casing below valve 30, and so on, the crank-shaft revolving in a given direction. To reverse the rotation of the crank-shaft, the reversing-lever 62 is moved, as before described, to bring the block 55 to the opposite side of the neutral center 41$^a$ of quadrant-lever 41.

It will be observed in the described arrangement of valve-gear it is impossible to establish a lead to the valve by setting the crank 43 in advance of a given right angle from the crank on the crank-shaft q, because if the rotation of the latter were reversed this lead would become a lag. Now in order to give the valve the proper lead, whatever may be the direction of rotation of the crank-shaft, I connect the pivot-pin 63, that connects rod 52 with lever 51, to the rod 65 through the link 64, as hereinabove described, whereby a motion independent of that of the valve-gear is imparted to said lever 51, and consequently to the valve-rod 50, in view of the fact that rod 65 is connected with the high-pressure piston-cylinder.

If slide-block 53 were moved so that the axis of its pin, to which rods 52 and 59 are connected, will be in line with the neutral center 41$^a$ of quadrant-lever 41, there will be no motion imparted to rod 52 by the oscillation of said lever 41; but if the crank-shaft were turned by hand the motion of the high-pressure piston-cylinder would impart motion to lever 51 through rod 65 and link 64, which motion is transmitted to the valve-rod and valve and determines the lead of the latter. Inasmuch as the valve travels synchronously with the high-pressure piston-cylinder this lead will be the same whatever the direction of rotation of the crank-shaft, as will be readily understood.

Figure 1:
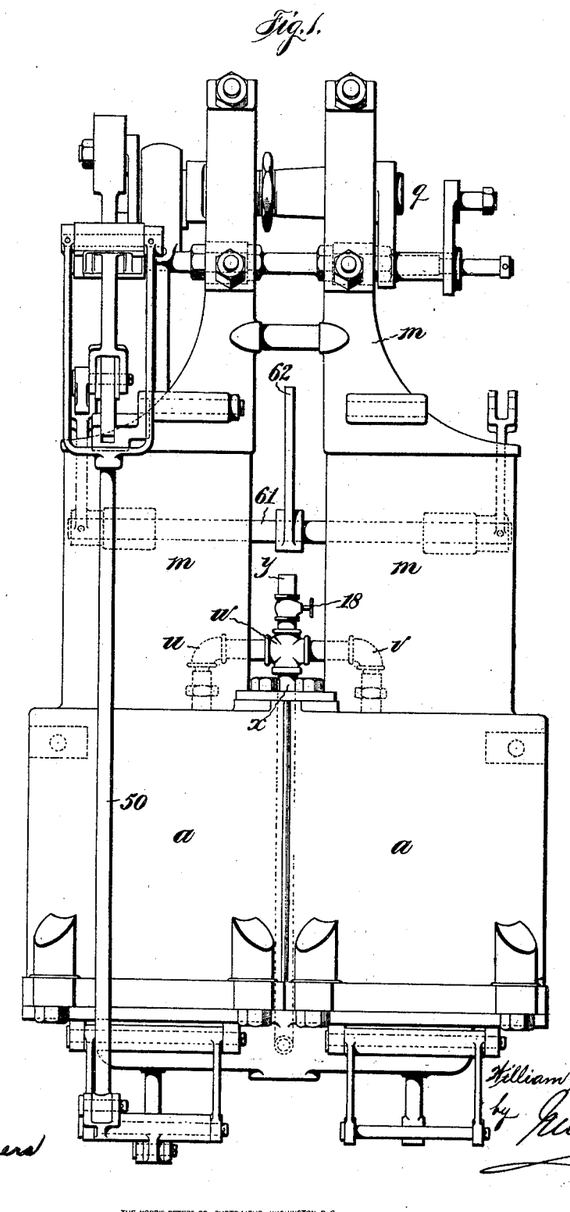
Figure 1 is an elevation of a twin compound locomobile-engine embodying my invention, a portion of the valve-gear for changing the operation of the engine from compound to semicompound, and vice versa, and for changing the direction of rotation of the crankshaft being removed.

As shown in Fig. 3, the piston 55 of the high-pressure cylinder is also chambered to form a dead-air chamber 56, the inner and outer heads of said piston being spaced by a spacing-ring suitably packed, said inner head seating on an annular shoulder and said outer head being bolted to the piston. This construction materially facilitates the tooling of the piston, and as the chambered head $c$ of the low-pressure cylinder $a$ is seated on the cap-plate $h$, which latter is bolted to the low-pressure cylinder, as shown in Fig. 1, it is merely necessary to disconnect the valve-rod 40 from its rock-lever 45 and remove the said cap-plate in order to remove the cylinder-head and its extension $e$ by unscrewing the latter from the stationary abutment $f$ or for removing the high-pressure cylinder from the low-pressure cylinder, in which case it is of course necessary to disconnect said high-pressure cylinder from the crank-shaft and from the rod 65 of the reversing-gear, as will be readily understood.

Having thus described my invention, what I claim as new therein, and desire to secure by Letters Patent, is—

1. In a telescopic engine, the combination with a low-pressure cylinder, a stationary abutment and a high-pressure piston-cylinder working in said low-pressure cylinder and on said abutment; of a valve-casing arranged axially in said cylinders a steam-chest in communication with the live-steam inlet surrounding said casing, the latter provided with ports in communication with the steam-chest and the high and low pressure cylinder, and a valve in said casing organized to control said ports to cause the engine to work compound, for the purpose set forth.

2. In a telescopic engine, the combination with a low-pressure cylinder, a stationary abutment and a high-pressure piston-cylinder working in said low-pressure cylinder and on said abutment; of a valve-casing arranged axially in said cylinders, a steam-chest in communication with the live-steam inlet surrounding said casing, the latter provided with ports in communication with said steam-chest and the high and low pressure cylinders, and a valve movable in said casing and organized to control said ports to cause the engine to work compound or semicompound, for the purposes set forth.

3. In a telescopic engine, the combination with a low-pressure cylinder, a stationary abutment and a high-pressure piston-cylinder working in said low-pressure cylinder and on said abutment; of a valve-casing arranged axially in said cylinders, a steam-chest in communication with the live-steam inlet surrounding said casing, the latter provided with ports in communication with the steam-chest and with the high and low pressure cylinders, a valve in said valve-casing organized to control said ports and cause the engine to work either compound or semicompound and means for varying the travel of said valve to change the operation of the engine from compound to semicompound and vice versa, for the purposes set forth.

4. In a telescopic engine, the combination with a low-pressure cylinder, a stationary abutment, a high-pressure piston-cylinder working in said low-pressure cylinder and on said abutment and the crank-shaft connected with the high-pressure cylinder; of a valve-casing arranged axially in said cylinders, a steam-chest, in communication with the live-steam inlet, surrounding said valve-casing, the latter provided with ports in communication with said steam-chest and with the high and low pressure cylinders, a valve in said casing organized to control said ports to cause the engine to work compound, and a reversing-gear connected with said valve for changing the direction of rotation of the engine, for the purpose set forth.

5. In a telescopic engine, the combination with a low-pressure cylinder, a stationary abutment, a high-pressure piston-cylinder working in said low-pressure cylinder and on said abutment, and the crank-shaft connected with said high-pressure cylinder; of a valve-casing arranged axially in said cylinders, a steam-chest, in communication with the live-steam inlet, surrounding said valve-casing, the latter provided with ports in communication with said steam-chest and with the high and low pressure cylinders, a valve in said casing organized to control said ports and cause the engine to work either compound or semicompound, a reversing-gear connected with the valve for changing the direction of rotation of the crank-shaft whether the engine works compound or semicompound, and mechanism controlled by the reversing-gear for varying the travel of the valve and thereby changing the operation of the engine from compound to semicompound or vice versa, for the purposes set forth.

6. In a telescopic engine, the combination with the low-pressure cylinder having a chambered head connectible with a source of live-steam supply, a chambered stationary abutment, and the high-pressure piston-cylinder working in said low-pressure cylinder and on said abutment; of a valve-casing arranged axially in said cylinders, a steam-chest encompassing said valve-casing, said steam-chest in perpetual communication with the chambers in the low-pressure cylinder-head and stationary abutment, said valve-casing provided with suitable ports in communication with the steam-chest and with the high and low pressure cylinders, and a valve in said casing constructed to control said ports, substantially as and for the purpose set forth.

7. In a telescopic engine, the combination with the low-pressure cylinder having a chambered head connectible with a source of live-steam supply, a chambered stationary abutment, and the high-pressure piston-cylinder working in said low-pressure cylinder and on said abutment; of a tubular valve-casing secured to said chambered head of the low-pressure cylinder and carrying the abutment, a steam-chest encompassing the valve-casing, said steam-chest in perpetual communication with the chambers in the low-pressure cylinder-head and the abutment, said valve-casing provided with suitable ports in communication with the steam-chest and with the high and low pressure cylinders and a valve in said casing constructed to control said ports, substantially as and for the purposes set forth.

8. In a telescopic engine, the combination with the low-pressure cylinder having a chambered head connectible with a source of live-steam supply, a chambered stationary abutment, and the high-pressure piston-cylinder working in said low-pressure cylinder and on said abutment; of a tubular valve-casing secured to said chambered head of the low-pressure cylinder and carrying the abutment, a steam-chest encompassing the valve-casing, said steam-chest in perpetual communication with the chambers in the low-pressure cylinder-head and the abutment, said valve-casing provided with suitable ports in communication with the steam-chest and with the high and low pressure cylinders and a tubular valve closed at both ends and constructed to control said ports, substantially as and for the purpose set forth.

9. A telescopic engine, comprising a stationary cylinder provided with an extension, a crank-shaft mounted in said extension, a stationary abutment, a piston-cylinder having reciprocating motion in said stationary cylinder and on said abutment, said piston-cylinder likewise provided with an extension guided by the extension of the low-pressure cylinder, and a connection connecting the extension of the piston-cylinder with the crank-shaft, for the purpose set forth.

10. In a telescopic engine, the combination with a low-pressure cylinder, a stationary abutment, a high-pressure piston-cylinder working in said low-pressure cylinder and on said abutment, an air-intake in communication with the outer end of the low-pressure cylinder whereby air is drawn into said end of the low-pressure cylinder on the instroke of the high-pressure piston-cylinder, and means preventing the air from escaping through said intake on the return stroke of said high-pressure piston-cylinder; of a pipe in communication with the air-chamber in said low-pressure cylinder and with the exhaust-passage of the engine, and means for diverting the flow of air from said exhaust-passage, for the purpose set forth.

11. In a telescopic engine, the combination with a low-pressure cylinder, a stationary abutment, a high-pressure piston-cylinder working in said low-pressure cylinder and on said abutment, and an air-chamber in the outer end of said high-pressure piston-cylinder adapted to exhaust into the corresponding end of the low-pressure cylinder on the instroke of said high-pressure piston-cylinder, an air-intake for said air-chamber and means preventing the air therein from escaping through said intake on the outstroke of said high-pressure piston-cylinder; of a pipe in communication with the air-space in the low-pressure cylinder and with the exhaust-passage of the engine, and means for diverting the flow of air from said exhaust-passage, for the purposes set forth.

12. In a telescopic engine, the combination with a low-pressure cylinder, a stationary abutment, a high-pressure piston-cylinder working in said low-pressure cylinder and on said abutment, an air-intake in communication with the outer end of the low-pressure cylinder whereby air is drawn into the same on the instroke of the high-pressure piston-cylinder, and means for preventing such air from escaping through said intake on the outstroke of said high-pressure piston-cylinder, a pipe-coupling and pipes leading therefrom to the outer end of the low-pressure cylinder and to the exhaust-passage of the engine, and a branch pipe leading from said coupling; of a check-valve in the pipe leading from the coupling to the aforesaid exhaust-passage, for the purposes set forth.

13. In a telescopic engine, the combination with a low-pressure cylinder, a stationary abutment, a high-pressure piston-cylinder working in said low-pressure cylinder and on said abutment, an air-intake in communication with the outer end of the low-pressure cylinder whereby air is drawn into the same on the instroke of the high-pressure piston-cylinder, and means for preventing such air from escaping through said intake on the outstroke of said high-pressure piston-cylinder, a pipe-coupling and pipes leading therefrom to the outer end of the low-pressure cylinder and to the exhaust-passage of the engine, and a branch pipe provided with a regulating-cock leading from said coupling; of a check-valve in the pipe leading from the coupling to the aforesaid exhaust-passage, for the purposes set forth.

14. A locomobile-engine comprising twin telescopic compound engines having a common exhaust-passage and comprising each a low-pressure cylinder, a stationary abutment and a high-pressure piston-cylinder working in said low-pressure cylinder and on said abutment; air-intakes in communication with the outer ends of the high and low pressure cylinders whereby air is drawn into the same on the instroke of the high-pressure piston-cylinder and means for preventing such air from escaping through said intakes on the outstroke of said high-pressure piston-cylinder; in combination with a four-way pipe-coupling, and pipes connected thereto and in communication with the air-spaces in the high and low pressure cylinders, a third pipe connected with the said coupling and in communication with the exhaust-passage of the engines, and pressure-controlled means for diverting the flow of air from said exhaust-passage through a fourth pipe connected with said coupling, substantially as and for the purposes set forth.

15. A locomobile-engine comprising twin telescopic compound engines having a common exhaust-passage and comprising each a low-pressure cylinder, a stationary abutment and a high-pressure piston-cylinder working in said low-pressure cylinder and on said abutment, air-intakes in communication with the outer ends of the high and low pressure cylinders whereby air is drawn into the same on the instroke of the high-pressure piston-cylinder, and means for preventing such air from escaping through said intakes on the outstroke of said high-pressure piston-cylinder; in combination with a four-way pipe-coupling, and pipes connected thereto and in communication with the air-spaces in the high and low pressure cylinders, a third pipe connected with the said coupling and in communication with the exhaust-passage of the engines, a pressure-controlled check-valve in said pipe, and a fourth pipe connected with coupling and provided with a regulating-cock, substantially as and for the purposes set forth.

16. The combination with the power cylinder and piston of a steam-engine; of an air-chamber, means for drawing air into and forcing such air from said chamber by the movements of the piston, a pipe connecting the air-chamber with the exhaust-passage of the engine, and means for diverting the flow of air from said exhaust-passage, for the purpose set forth.

17. The combination with the power cylinder and piston of a steam-engine; of an air-chamber, means for drawing air into and forcing such air from said chamber by the movements of the piston, a relief-pipe connecting the air-chamber with the exhaust-passage of the engine, a branch pipe connected with said relief-pipe, and a pressure-controlled check-valve in the last-named pipe on the exhaust side of the branch pipe, for the purposes set forth.

18. In a telescopic engine, the combination with the low-pressure cylinder, the stationary abutment and the high-pressure piston-cylinder, both said cylinders closed at their outer ends; of means for preventing compression of air in the said cylinder ends, for the purposes set forth.

19. The combination with a telescopic engine comprising a low-pressure cylinder, a stationary abutment and a high-pressure piston-cylinder working in said low-pressure cylinder and on said abutment; of a pump-chamber, and means for drawing air into and forcing such air from said chamber by the reciprocating movements of the piston-cylinder, for the purposes set forth.

In testimony that I claim the foregoing as my invention I have signed my name in presence of two subscribing witnesses.

WILLIAM SCHNEIDER.

Witnesses:
JOHN M. WALLACE,
O. A. WACHS.